US007299553B1

(12) United States Patent
Brann

(10) Patent No.: US 7,299,553 B1
(45) Date of Patent: Nov. 27, 2007

(54) ZERO-OFFSET POWER HANDSAW

(76) Inventor: Jimmy N. Brann, 3846 Frienship Church Rd., Farmville, NC (US) 27828

( * ) Notice: Subject to any disclaimer, the term of this patent is extended or adjusted under 35 U.S.C. 154(b) by 155 days.

(21) Appl. No.: 11/257,806

(22) Filed: Oct. 26, 2005

(51) Int. Cl.
*B23D 45/16* (2006.01)

(52) U.S. Cl. ............................ 30/370; 30/276; 30/390

(58) Field of Classification Search .................. 30/276, 30/371, 373, 374, 375, 376, 388, 390; 144/136.95, 144/154.5
See application file for complete search history.

(56) References Cited

U.S. PATENT DOCUMENTS 2,427,580 A 9/1947 Stryker
2,610,658 A * 9/1952 Koeling ........................ 30/373
2,819,742 A * 1/1958 Blachly ........................ 30/373
2,823,713 A * 2/1958 Goldsmith ............... 144/136.1
3,042,089 A * 7/1962 Lyons .......................... 30/373
3,886,658 A 6/1975 Wikoff
4,056,028 A 11/1977 Patterson
4,322,920 A 4/1982 Wells
4,347,450 A 8/1982 Colligan
4,577,526 A 3/1986 Stäbler
5,086,750 A 2/1992 Chiuminatta et al.
5,445,480 A 8/1995 Merriman
D440,849 S 4/2001 Sakai et al.
D473,771 S 4/2003 Hayakawa et al.
6,574,867 B1 * 6/2003 Bradshaw .................... 30/122
7,043,845 B2 * 5/2006 Lukens ........................ 30/370

* cited by examiner

*Primary Examiner*—Hwei-Siu C. Payer
(74) *Attorney, Agent, or Firm*—Donald R. Schoonover

(57) ABSTRACT

A zero-offset power handsaw having a body unit including a skid plate and a handle, a circularly shaped saw blade, a blade mounting mechanism including a removable mounting device having a head, a guard, and an electric motor. The saw blade has a forward extremity and includes a hub for containing a forward extension of the head therein. The guard has a forward extremity that is co-planar with the forward extremity of the saw blade. A adjusting mechanism allows selective and angular adjustment of the skid plate relative to the handle. A switch allows electrical power to be selectively provided to the electric motor.

5 Claims, 1 Drawing Sheet

ZERO-OFFSET POWER HANDSAW

BACKGROUND OF THE INVENTION

1. Field of the Invention

The present invention relates to construction equipment and, more specifically without limitation, to power hand tools.

2. Description of the Related Art

The growth of a building and construction industry of a nation can be an indicator of that country's economic health. When an economy is strong and dynamic, new buildings are erected, new roads are built, and new homes are produced. Vigorous economies also allow older buildings to be renovated. Homes, offices, and major institutions also are scheduled for repair and/or needed maintenance projects during economic booms. Painters, carpenters, carpet layers, roofers, electricians, and plumbers are a major part of the building and construction industry.

Craftsmen and tradesmen use a variety of tools in the completion of their labors. Some of the tools are specific to a particular skill or trade.

Plumbers, for example, make use of pipe wrenches while electricians use wire connectors. Other tools are common to most skilled craftsmen. Tools such as screwdrivers are an example of this class of tool. One tool that is typically found in one form or another on any job site is a saw.

Saws may be classified into two large categories. There are handsaws. These saws are typically used on jobs that require a limited number of cuts to be made on a piece of work. They are also used in certain settings where electrical current is not easily accessible. The second category is the power saw. These saws are fitted with motors or engines that increase their power and make them useful in remote settings. The power saw may be found in workshops, factories, and in forests far from civilization.

Whether it is a handsaw or a power saw, the function of a saw is the same. It is designed to cut all types of material including wood, plastic, and metal. There are times, though, when the size or design of a particular saw is contrary to the type of task being performed. For example, a person desiring to cut into a section of flooring to remove damaged plywood may find it fatiguing and frustrating to cut into a corner area. Using a large power saw is perfect for cutting into open areas but when the cut approaches a cabinet or corner area, the power saw becomes awkward to use.

What is needed is a power handsaw that can cut a kerf immediately adjacent to a corner juncture defined by a horizontal surface and a vertical surface.

PRINCIPAL OBJECTS AND ADVANTAGES OF THE INVENTION

The principal objects and advantages of the present invention include: providing a power handsaw that can cut a kerf immediately adjacent to a corner juncture defined by a horizontal surface and a vertical surface; and generally providing such a power handsaw that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

The improvements of the zero-offset power handsaw of the present invention include a body unit, a saw blade, a guard, an electric motor, and a power connection.

The body unit has a forward end and includes a handle, a skid plate, and a blade mounting mechanism that extends forwardly from the forward end wherein the blade mounting mechanism includes a removable mounting device with a head having a thickness dimension and a shaft.

The saw blade is circularly shaped and has a first or outer side, a second or inner side, a periphery, a plurality of teeth extending radially outwardly from the periphery and having first forward extremities, and a centrally located hub that extends outwardly from the first side of the saw blade. The hub has an inner surface with a depth dimension that is greater than the thickness dimension of the head of the mounting device, and a centrally located throughbore that is dimensioned to receive the shaft of the removable mounting device therethrough.

The guard is mounted on the forward end of the body unit and has an edge with a second forward extremity.

The electric motor is mounted internally within the body unit. The power connection is structured and configured to connect the electric motor to an electrical power source. A switch may be provided to selectively provide power to the electric motor from the power source.

The zero-offset power handsaw is structured and configured such that the first forward extremities of the plurality of teeth are co-planar with the second forward extremity of the guard, and the electric motor operatively rotates the saw blade when the saw blade is mounted on the blade mounting mechanism.

The zero-offset power handsaw may also include an adjusting mechanism that is structured to selectively and angularly adjust the skid plate relative to the handle.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The zero-cutoff power handsaw of the present invention is designed to cut a kerf immediately adjacent to a corner juncture defined by a horizontal surface and a vertical surface. It is particularly useful when making very precise cuts when working near or beneath a cabinet unit in a kitchen, for example.

Figure 2:
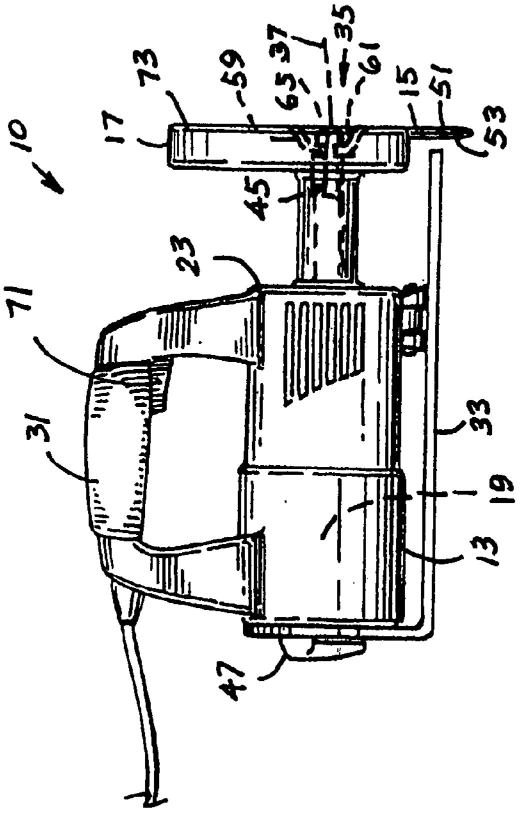
FIG. 2 is a reduced side elevational view of the zero-offset power handsaw in accordance with the present invention.
Figure 1:
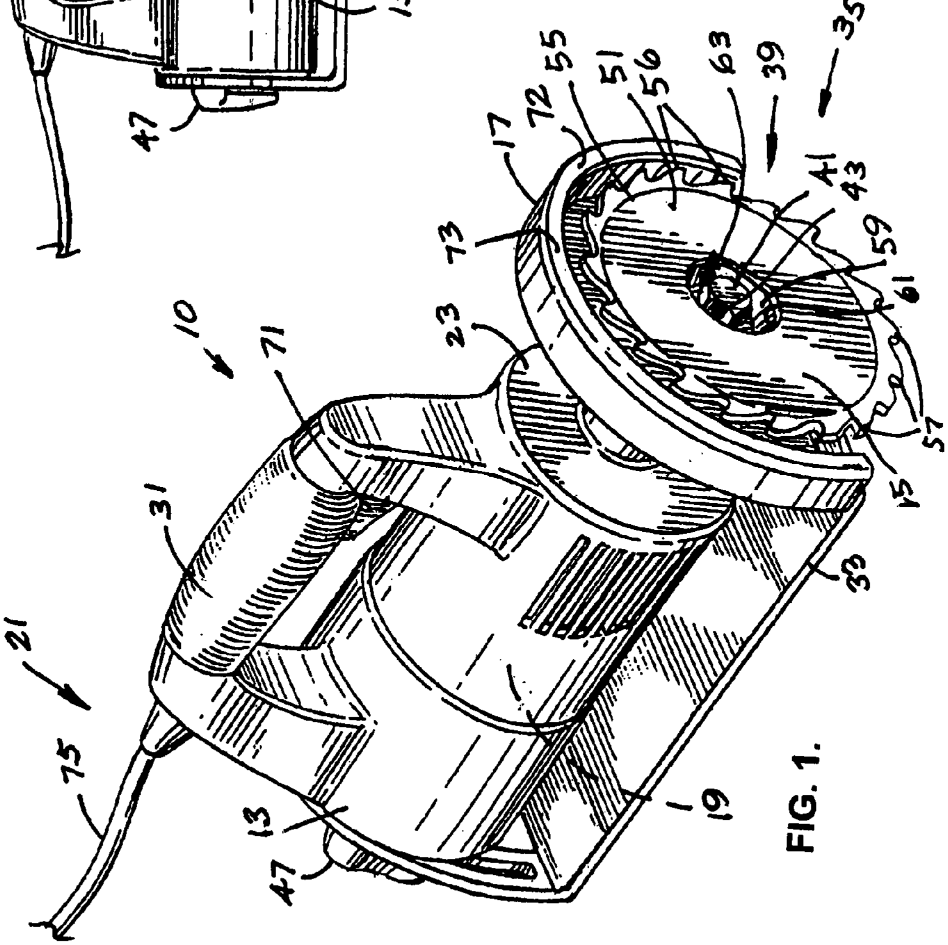
FIG. 1 is a perspective view of a zero-offset power handsaw in accordance with the present invention.

The reference numeral 10 generally refers to a power handsaw in accordance with the present invention, as shown in FIGS. 1 and 2. The power handsaw 10 includes a body unit 13, a saw blade 15, a guard 17, an electric motor 19, and a power connection 21.

The body unit 13 has a forward end 23 and includes a handle 31, a skid plate 33, and a blade mounting mechanism 35. The blade mounting mechanism 35, which extends forwardly from the forward end 23 of the body unit 13 along a longitudinal axis 37, has a removable mounting device 39 with a head 41 having a thickness dimension 43 and a shaft 45. For some applications, the body unit 13 may include an adjusting mechanism 47 that is structured to selectively allow the skid plate 33 to be angularly adjustable relative to the handle 31.

The saw blade 15 is circularly shaped and has an outer or first side 51, an inner or second side 53, a periphery 55, a plurality of teeth 56 extending radially outwardly from the periphery 55 and having first forward extremities 57, and a centrally located hub 59 extending outwardly from the second side 53 of the saw blade 15. The hub 59 has an inner surface 61 with a depth dimension 63 that is greater than the thickness dimension 43 of the head 41 of the mounting device 39 and a centrally located throughbore 65 dimensioned to receive the shaft 45 of the removable mounting device 39 therethrough. Preferably, the saw blade 15 is dimensioned to operatively extend approximately one inch below a plane of the skid plate 33.

The guard 17, which is mounted on the forward end 23 of the body unit 13, has an edge 72 with a second forward extremity 73.

The electric motor 19 is mounted internally within the body unit 13.

The electric motor 19 operatively rotates the saw blade 15 about the longitudinal axis 37 when the saw blade 15 is mounted on the blade mounting mechanism 35.

The power connection 21 includes a power cord 75 for connection to an electrical power source (not shown), such as an available electrical circuit. The power connection may also include a switch 71 that is structured to selectively provide power to the electric motor 19 from the power source. Preferably, the switch 71 is located relative to the handle 31 wherein access is provided for convenient use by a forefinger of a user.

For some applications, the plurality of teeth 56 may have a "set" such that a kerf cut by the saw blade 15 is wider than a thickness of the saw blade 15 between the outer side 51 and the inner side 53 of the saw blade 15 in order to minimize the potential for binding as the kerf is being cut. In that event, the first forward extremities 57 of the plurality of teeth 56 are co-planar with the second forward extremity 73 of the guard 17. For other applications where a "set" is not desired in the plurality of teeth 56, at least relative to the outer side 51 of the saw blade 15, the first forward extremities 57 of the plurality of teeth 56 are also co-planar with the outer side 51 of the saw blade 15.

In an application of the zero-offset power handsaw 10 of the present invention, a user places the edge 72 of the guard 17 against a vertical surface that forms a juncture with a horizontal surface, along which juncture the user desires to cut a saw kerf. The user then activates the motor of the power handsaw 10 by squeezing the switch 71 with a forefinger. The user then slides the power handsaw downwardly along the vertical surface until the skid plate 33 abuts the horizontal surface that forms the juncture with the vertical surface. The user then slides the edge 72 along the vertical surface to obtain the desired saw kerf immediately adjacent to the juncture.

It is to be understood that while certain forms of the present invention have been illustrated and described herein, it is not to be limited to the specific forms or arrangement of parts as described and shown.

What is claimed and desired to be covered by Letters Patent is:

1. A power handsaw, comprising:
- (a) a body unit having a forward end and including:
  - (1) a handle,
  - (2) a skid plate, and
  - (3) a blade mounting mechanism extending forwardly from the forward end, the blade mounting mechanism having a removable mounting device with a head having a thickness dimension and a shaft;
- (b) a circularly shaped saw blade having:
  - (1) a first or outer side,
  - (2) a second or inner side,
  - (3) a periphery,
  - (4) a plurality of teeth extending radially outwardly from the periphery and having first forward extremities,
  - (5) a centrally located hub extending outwardly from the second side of the saw blade, the hub having:
    - (A) an inner surface with a depth dimension that is greater than the thickness dimension of the head of the mounting device, and
    - (B) a centrally located throughbore dimensioned to receive the shaft of the removable mounting device therethrough;
- (c) a guard mounted on the forward end of the body unit, the guard having an edge with a second forward extremity;
- (d) an electric motor mounted internally within the body unit; and
- (e) a power connection for connection to an electrical power source; and
- (f) wherein:
  - (1) the first forward extremities of the plurality of teeth are co-planar with the second forward extremity of the guard, and
  - (2) the electric motor operatively rotates the saw blade when the saw blade is mounted on the blade mounting mechanism.

2. The power handsaw as described in claim 1, wherein the first forward extremities of the plurality of teeth are also co-planar with the first side of the saw blade.

3. The power handsaw as described in claim 1, further comprising an adjusting mechanism structured to selectively and angularly adjust the skid plate relative to the handle.

4. The power handsaw as described in claim 1, further comprising a switch structured to selectively provide power to the electric motor from the power source.

5. The power handsaw as described in claim 4, wherein the switch is located relative to the handle to provide convenient access for use by a forefinger of a user.

* * * * *